(12) United States Patent  
Yukawa et al.

(10) Patent No.: US 8,315,288 B2
(45) Date of Patent: Nov. 20, 2012

(54) SOLID-STATE DYE LASER

(75) Inventors: Mikio Yukawa, Atsugi (JP); Tetsuo Tsutsui, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

(21) Appl. No.: 12/549,411

(22) Filed: Aug. 28, 2009

(65) Prior Publication Data

US 2010/0054294 A1 Mar. 4, 2010

(30) Foreign Application Priority Data

Aug. 29, 2008 (JP) ................. 2008-221457

(51) Int. Cl.
*H01S 3/20* (2006.01)

(52) U.S. Cl. ............... 372/53; 372/54; 372/70; 372/71; 372/72; 372/73; 372/74; 372/75

(58) Field of Classification Search .......... 372/51–54, 372/69–75
See application file for complete search history.

(56) References Cited

U.S. PATENT DOCUMENTS

| | | | | |
|---|---|---|---|---|
| 3,753,148 | A | * | 8/1973 | Billman .................. 372/20 |
| 4,710,937 | A | * | 12/1987 | Oomori et al. ............ 372/53 |
| 5,136,596 | A | * | 8/1992 | Rao et al. ................ 372/20 |
| 5,610,932 | A | * | 3/1997 | Kessler et al. ........... 372/39 |
| 5,881,089 | A | * | 3/1999 | Berggren et al. ......... 372/96 |
| 6,166,489 | A | * | 12/2000 | Thompson et al. ........ 313/506 |
| 6,658,037 | B2 | * | 12/2003 | Kahen et al. ............. 372/70 |
| 6,781,147 | B2 | | 8/2004 | Chen et al. |
| 6,845,114 | B2 | * | 1/2005 | Patton et al. ............. 372/39 |
| 6,847,163 | B1 | | 1/2005 | Tsutsui et al. |
| 7,138,763 | B2 | | 11/2006 | Liao et al. |
| 7,260,135 | B2 | | 8/2007 | Shimomura et al. |
| 7,273,663 | B2 | | 9/2007 | Liao et al. |
| 7,307,940 | B2 | | 12/2007 | Nomura et al. |
| 7,317,282 | B2 | | 1/2008 | Tsutsui et al. |
| 7,449,724 | B2 | | 11/2008 | Yamazaki et al. |
| 7,449,727 | B2 | | 11/2008 | Sato et al. |
| 7,502,392 | B2 | | 3/2009 | Nomura et al. |
| 7,505,487 | B2 | | 3/2009 | Abe et al. |
| 7,522,644 | B2 | | 4/2009 | Abe et al. |

(Continued)

FOREIGN PATENT DOCUMENTS

JP 361287188 A * 12/1986

(Continued)

OTHER PUBLICATIONS

Nir Tessler, "Lasers based on semiconductirng organic materials" Advanced Materials 1999, 11 No. 5 pp. 363-370.*

(Continued)

*Primary Examiner* — Tod T Van Roy
*Assistant Examiner* — Delma Forde
(74) *Attorney, Agent, or Firm* — Eric J. Robinson; Robinson Intellectual Property Law Office, P.C.

(57) ABSTRACT

To reduce the laser threshold by efficiently exciting a light-emitting body in a solid-state dye laser with light having high density, thereby facilitating emission of laser beams, and to miniaturize a solid-state dye laser including an excitation light source. A solid-state dye laser capable of emitting laser beams by efficiently introducing light from an excitation light source to a light-emitting body incorporated in an optical resonator structure and exciting the light-emitting body with light with high density, is realized.

14 Claims, 5 Drawing Sheets

U.S. PATENT DOCUMENTS

| | | | |
|---|---|---|---|
| 7,666,696 | B2 | 2/2010 | Hersee |
| 7,835,416 | B2 * | 11/2010 | Adachi ............... 372/69 |
| 2004/0140758 | A1 * | 7/2004 | Raychaudhuri et al. ...... 313/504 |
| 2004/0183082 | A1 | 9/2004 | Yamazaki |
| 2004/0202893 | A1 | 10/2004 | Abe |
| 2005/0006648 | A1 | 1/2005 | Yamazaki et al. |
| 2005/0008052 | A1 | 1/2005 | Nomura et al. |
| 2005/0047458 | A1 | 3/2005 | Nomura et al. |
| 2006/0214151 | A1 | 9/2006 | Abe et al. |
| 2006/0267483 | A1 | 11/2006 | Tsutsui et al. |
| 2008/0076267 | A1 * | 3/2008 | Oishi et al. .............. 438/785 |
| 2008/0253420 | A1 | 10/2008 | Nomura et al. |
| 2009/0052491 | A1 | 2/2009 | Nomura et al. |
| 2010/0054291 | A1 * | 3/2010 | Yukawa et al. ............... 372/39 |

FOREIGN PATENT DOCUMENTS

| | | | |
|---|---|---|---|
| JP | 361287189 | * | 12/1986 |
| JP | 2004-282012 | | 10/2004 |
| JP | 2007-208173 | | 8/2007 |

OTHER PUBLICATIONS

Samuel et al., "Organic Semiconductor Lasers" Chemical Reviews, vol. 107, No. 4, pp. 1272-1295, Mar. 27, 2007.

Yang et al., "Hybrid Optoelectronics: A Polymer Laser Pumped by a Nitride Light-Emittting Diode" Applied Physics Letters 92 (16) pp. 163306-1-163306-3, Apr. 23, 2008.

Vasdekis et al., "Diode pumped distributed Bragg reflector lasers based on a dye-to-polymer energy transfer blend" Optics Express, vol. 14, No. 20, pp. 9211-9216, Oct. 2, 2006.

Lupton, "Over the rainbow" News & Views, Nature, vol. 453, pp. 459-460, May 22, 2008.

* cited by examiner

SOLID-STATE DYE LASER

BACKGROUND OF THE INVENTION

1. Field of the Invention

The present invention relates to a solid-state dye laser in which a solid-state dye is used.

2. Description of the Related Art

A liquid dye laser, a solid-state dye laser, and the like are known as a tunable organic laser in which the wavelength can be tuned in a visible range.

In a liquid dye laser, a laser dye solution is circulated; therefore, there are advantages in that degradation of the laser dye is unlikely to affect the laser and replacement of the solution is possible. However, in order to use a solution, a solution tank, a circulator for circulating a solution, and the like are needed, which causes a problem of the apparatus being large.

On the other hand, a solid-state dye laser can be compact since a thin film of laser dye is used; however, a thin film of laser dye that is once formed cannot be replaced and thus, it is crucial to suppress degradation of the laser dye thin film.

A coherent light source (various lasers: for example, a gas laser such as an excimer laser and a solid-state laser such as a NdYAG laser) is normally used as an excitation light source (also referred to as a light source in this specification) for operation of a dye laser. In the case of using an incoherent light source such as a xenon lamp, a halogen lamp, a light-emitting diode, or the like as an excitation light source, it is not easy to obtain light by laser emission from a solid-state dye. To obtain light by laser emission, it is necessary to reduce the laser threshold (light density of the excitation light source per unit of time), and for example, it is reported that the laser threshold is reduced by provision of a resonator structure which does not leak light by stimulated emission and by irradiation of dye molecules with excited light with high density; accordingly, laser emission is easily caused (e.g., see Patent Document 1).

For emission of a laser beam from a solid-state dye laser, it is necessary that a solid-state dye is irradiated using an excitation light source having a high light intensity per unit area (light density) and absorption of light with high density is induced in the solid-state dye. For this purpose, a coherent light source with high light density is usually used as the excitation light source. In the case of not using a laser light source, irradiation needs to be performed in such a manner that light from an incoherent light source such as various lamps is gathered with a lens or the like to increase light density. In the case of irradiating a solid-state dye with light having high density using either laser light or incoherent light, it is difficult to use a plane light source which is in contact with a solid-state dye film. Even using a thin the solid-state dye film, there is a limit in miniaturization of the entire dye laser system including an excitation light source. Therefore, it has been considered that thinning the entire system would be impossible.

[Reference]

[Patent Document 1] Japanese Published Patent Application No. 2004-282012

SUMMARY OF THE INVENTION

An object of an embodiment according to the present invention is to reduce the laser threshold by efficiently exciting a light-emitting body in a solid-state dye laser with light having high density, whereby emission of a laser beam is facilitated, and to miniaturize a solid-state dye laser including an excitation light source.

In order to achieve the above-mentioned object, an embodiment of the present invention realizes a solid-state dye laser capable of emitting a laser beam by efficiently introducing light from an excitation light source to a light-emitting body incorporated in an optical resonator structure and exciting the light-emitting body with light with high density.

A solid-state dye laser according to an embodiment of the present invention includes a first light-emitting body which receives light from an excitation light source and emits light, and an optical resonator which is adjacent to the first light-emitting body, in which the optical resonator includes a second light-emitting body which receives light emitted from the excitation light source and the first light-emitting body and emits light.

An embodiment of the present invention is a solid-state dye laser in which a first light-emitting body and a second light-emitting body which is incorporated in an optical resonator structure are formed over a substrate. Further, according to an embodiment of the present invention, the first light-emitting body (light-gathering medium) is formed using a substance that absorbs light emitted from an excitation light source, and the second light-emitting body (laser medium) is formed using a substance that absorbs light emitted from the excitation light source and the first light-emitting body.

A solid-state dye laser according to an embodiment of the present invention includes a first light-emitting body and an optical resonator which are formed over a substrate, in which the optical resonator includes a diffraction grating and a second light-emitting body, the first light-emitting body is formed using a substance that absorbs light emitted from an excitation light source, the second light-emitting body is formed using a substance that absorbs light emitted from the excitation light source and the first light-emitting body, and the first light-emitting body and the second light-emitting body are formed in a part of a region overlapping the substrate and in a region overlapping the diffraction grating respectively so that the first light-emitting body and the second light-emitting body are separated from each other.

A solid-state dye laser according to an embodiment of the present invention includes a plurality of diffraction gratings formed over a substrate, in which one of a first light-emitting body and a second light-emitting body is formed in a part of a region overlapping the substrate and the diffraction gratings, the first light-emitting body is formed using a substance that absorbs light emitted from a light source, and the second light-emitting body is formed using a substance that absorbs light emitted from the light source and the first light-emitting body.

A solid-state dye laser according to an embodiment of the present invention includes a plurality of diffraction gratings formed over a substrate, a first light-emitting body is formed over the substrate and the diffraction gratings, a second light-emitting body is formed over at least a part of the diffraction gratings and the first light-emitting body which overlaps the part of the diffraction gratings, the first light-emitting body is formed using a substance that absorbs light emitted from a light source, and the second light-emitting body is formed using a substance that absorbs light emitted from the light source and the first light-emitting body.

A solid-state dye laser according to an embodiment of the present invention includes a light source, a first light-emitting body, and an optical resonator between a pair of substrates, in which the optical resonator includes a diffraction grating and a second light-emitting body, the light source is provided for one of the substrates, the first light-emitting body and the diffraction grating are formed in contact with the other substrate and the second light-emitting body is formed in a region overlapping at least the diffraction grating, the first light-emitting body is formed using a substance that absorbs light emitted from the light source, and the second light-emitting body is formed using a substance that absorbs light emitted from the light source and the first light-emitting body.

In each of the above-described structures, the first light-emitting body is formed using a substance having an emission quantum efficiency of 50% or higher.

In each of the above-described structures, a reflector may be provided over an edge portion of the substrate which is not located in a direction in which a beam is emitted by the optical resonator from the solid-state dye laser.

By the above-described structures, light emitted from the excitation light source (plane light source provided to face the substrate) is absorbed by the first light-emitting body, the light absorbed by the first light-emitting body makes a substance used for the first light-emitting body emit light, and the light emitted from the first light-emitting body is absorbed by the second light-emitting body. By absorption of light by the second light-emitting body in this manner, laser active dye molecules inside the optical resonator including the second light-emitting body are excited, so that laser emission can be realized.

The principle of absorption of light with high density into a second light-emitting body (laser medium) inside the optical resonator with the use of the excitation light source (plane light source), the first light-emitting body (light-gathering medium), and the laser medium will be described below.

A slab-shaped thin film having a long side L, a short side W, and a thickness D as the shape of the first light-emitting body is considered, and it is assumed that a top surface of this slab-shaped thin film is in contact with an air layer (with a refractive index of 1.0) and a bottom surface thereof is in direct contact with glass with a refractive index of 1.54 or is in contact with a glass substrate with a low refractive index layer (e.g., a low refractive index polymer with a refractive index of 1.3) interposed therebetween. The top surface of this slab-shaped thin film having an area of L·W is irradiated with light with an energy density per unit area I (J/cm$^2$). It is easy to adjust the absorption amount of irradiation light into the thin film in consideration of the thickness of the thin film and the light absorption coefficient of the first light-emitting body, and for example, the absorptance can be set at 80 to 100%. This absorptance is denoted by A. The light absorbed by the first light-emitting body is converted into light having a longer wavelength than the absorbed light at a quantum efficiency Q. In other words, I·L·W, which is a total amount of light from an excitation light source (plane light source), is converted to I·L·W·A·Q, which is a total amount of light emitted from the first light-emitting body.

Light from the first light-emitting body, which is generated in the slab-shaped thin film, is released to the outside of the thin film as a waveguide light component, which travels inside the thin film and is emitted from an edge surface of the thin film, and a space radiation component, which is emitted from the top and bottom surfaces of the thin film, based on optical principle. The percentage of the waveguide light component in the total amount of emitted light is P. When there is a relation, L>>W, the total amount of light emitted from the edge surface extending in the length direction of the slab-shaped thin film, with respect to the total amount of excitation light from the excitation light source (plane light source), is I·L·W·A·Q·P. Since the size of the edge surface (on one side) of the thin film is L·D, the intensity per unit area of the light emitted from the edge surface is (I·L·A·Q·P)/(2L·D)= (I·A·Q·P·W)/2D.

When the thin film formed using the first light-emitting body has a shape with a long side of 10 mm, a short side of 4 mm, and a thickness of 300 nm, the absorptance A is 100%, the emission quantum efficiency Q is 80%, and the percentage of the waveguide light component P is 50%, the intensity per unit area of light at the edge surface of the thin film is 26000 times as high as I. That is, it is found that the density per unit area of light from the edge surface of the thin film can be higher than that of excitation light directly emitted from the excitation light source (plane light source) by four or more digits.

The simple calculation of the light-gathering effect (light-gathering rate) by the first light-emitting body provided to face the excitation light source (plane light source) is only an example, and it is possible to further increase the number of digits by devising the shape of the first light-emitting body or the material and shape of the substrate and the low refractive index layer. For example, a distributed Bragg reflector (DBR) resonator structure is formed in the vicinity of the edge surface on one side of the thin film. The thin film can be toroidal, the DBR structure can be formed outside the thin film, and the optical resonator structure including the second light-emitting body can be provided in the toroid's hole. Therefore, the value of the rate of light gathered by the first light-emitting body can be more than several tens of thousands times in the present invention.

There are many ways of introducing light, which is gathered into the thin film formed using the first light-emitting body as a waveguide light component, to an optical resonator in which the second light-emitting body is used as a laser medium. The simplest way is such that an optical resonator formed using the second light-emitting body is provided parallel to the slab-shaped thin film of the first light-emitting body, and light is coupled between edge surfaces of the first light-emitting body and the second light-emitting body through a narrow air layer. In this case, the optical resonator including the second light-emitting body can be a thin film (with a shape such as a square, a rectangle, a polygon, a circle, or an ellipse) having a reflective edge surface. Such a thin film having various shapes can be combined with a distributed feedback (DFB) resonator or a DBR resonator. Note that the optical resonator including the second light-emitting body may have a diffraction grating structure or a photonic crystal structure.

Other than the direct coupling through a narrow air layer, many methods such as light coupling through a transparent light waveguide, coupling through an optical diffraction grating structure, a method using a one-dimensional photonic crystal structure, and a method using a two-dimensional photonic crystal structure can be used as a light coupling method between the thin film of the first light-emitting body and the optical resonator in which the second light-emitting body is used as a laser medium.

In the above description, a thin film having a perpendicular edge surface is used as the first light-emitting body; however, the first light-emitting body may be formed over a substrate having an optical diffraction grating structure or the first light-emitting body itself may be formed to have a shape of an optical diffraction grating, whereby light emitted from the first light-emitting body can be transferred without leaking from upper and bottom planes, and efficiency of gathering and emitting light to the outside can be further increased. In such a case, for example, an optical diffraction grating is formed over an entire surface of a substrate, and then a first light-emitting body and a second light-emitting body may be formed to be separate from each other; alternatively, after formation of a first light-emitting body so as to cover an optical diffraction grating structure formed over a substrate, the second light-emitting body may be separately formed only in a region where an optical resonator is formed.

Further, in the case where light from an excitation light source (plane light source) is not sufficiently absorbed by the first light-emitting body, a light reflective layer can be formed on a surface of a substrate on an opposite side to the surface irradiated with light so that light from the excitation light source (plane light source) can be absorbed by the first light-emitting body again. Further, light which is not absorbed by the first light-emitting body is directly absorbed by the second light-emitting body included in the optical resonator, whereby the use efficiency of light can be further improved.

In the present invention, any shape can be applied for the light source; however, a plane light source is preferable for convenience as a compact laser. In particular, a thin-film light source like an organic EL element is desirable, and a surface emission which is formed to be a plane shape using a light-emitting diode (a light-emitting diode array), a cold cathode tube, or a plane fluorescent lamp can also be used.

According to an embodiment of the present invention, a solid-state dye laser including an excitation light source in addition to the above-described structure can be realized.

In other words, a light source, a first light-emitting body, and an optical resonator including a second light-emitting body can be included between a pair of substrates; thus, a so-called a system having an internal light source in which all structures are incorporated between a pair of glass substrates can be formed. In this system, firm sealing between the pair of substrates is performed with an adhesive resin or the like, and only a lead wire for driving the plane light source is led out of the glass substrates. In the case of using an organic EL element as an internal light source, a plane electrode which is different from an electrode formed in contact with the substrate preferably has a light-transmitting property.

In each of the above-described structures, a substance (an organic or inorganic substance) whose emission quantum efficiency (percentage of generated photons out of absorbed photons) is high (preferably, of 50% or higher) can be used as a substance for the first light-transmitting body. In addition, a substance (an organic or inorganic substance) having not only a high emission quantum efficiency (preferably, of 50% or higher) but also a laser active property (a so-called laser dye) can be used as a substance for the second light-emitting body. Note that the substance used for the first light-emitting body is preferably one of a variety of fluorescent dyes, in particular, a light-emitting material for an organic EL element whose high emission quantum efficiency when it is in the form of a solid-state thin film is proved; however, the substance is not limited thereto. The substance that can be used for the second light-emitting body may be any of stilbene-based, coumarin-based, xanthene-based, cyanine-based, oxazine-based, rhodamine-based, and styryl-based organic dyes which are known as laser dyes; however, the substance is not limited thereto.

In an embodiment of the present invention, a first light-emitting body is irradiated with light from a plane light source having not high light density per unit area, light emitted from the first light-emitting body is gathered as waveguide light inside the thin film of the first light-emitting body, whereby a second light-emitting body can be excited by light with high density, and the second light-emitting body (laser medium) incorporated in an optical resonator can satisfy a condition for laser emission. That is, the excitation energy threshold for laser emission in the solid-state dye laser is effectively reduced, whereby laser emission can be facilitated. A solid-state dye laser of an embodiment according to the present invention can emit a laser beam even in the case of using an incoherent light source having lower output than a conventional light source, and any of various light sources can be used without limitation to a coherent light source having high output. Further, a solid-state dye laser of an embodiment according to the present invention can be miniaturized with ease by utilizing a feature of a solid state. Furthermore, since a solid-state dye laser in which a thin-film light source such as an organic EL element is incorporated can be formed, the laser is formed using two glass or plastic substrates in appearance and is an ultra lightweight and ultra thin solid-state dye laser capable of being driven directly by connection to a power source. When the solid-state dye laser is combined with another compact device, it can be applied to a wide variety of purposes.

DETAILED DESCRIPTION OF THE INVENTION

Hereinafter, embodiments of the present invention will be described in detail with reference to the accompanying drawings. However, the present invention is not limited to explanation to be given below, and it is to be easily understood that modes and details thereof can be variously modified without departing from the purpose and the scope of the present invention. Therefore, the present invention should not be interpreted as being limited to what is described in the embodiments described below.

Embodiment 1

In Embodiment 1, a structure of a solid-state dye laser which is an embodiment of the present invention will be described.

Figure 1A:
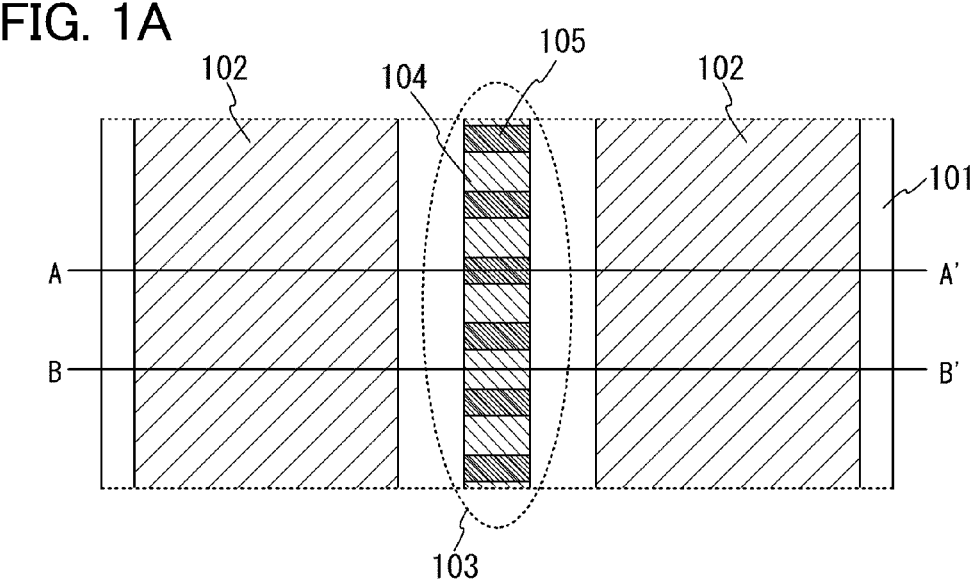
FIGS. 1A to 1C illustrate a solid-state dye laser according to an embodiment of the present invention.

A solid-state dye laser which is an embodiment of the present invention is provided with first light-emitting bodies 102 and an optical resonator 103 over a substrate 101 having a property of not absorbing light such as a substrate having an insulating surface, as illustrated in the top view of FIG. 1A. The optical resonator 103 has a structure in which a second light-emitting body 104 is stacked over a grating (diffraction grating) 105 formed over the substrate. Note that for the substrate 101, glass, quartz, plastic, or the like can be used for example.

The grating 105 formed over the substrate can be formed using a light-transmitting material such as silicon oxide or silicon nitride by a known photolithography technique or nanoimprint technique.

Figure 1B:
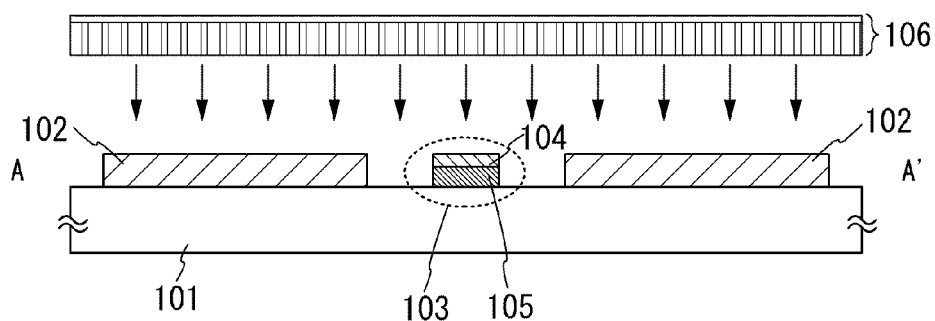

FIG. 1B is a cross-sectional view taken along line A-A' in FIG. 1A. Along line A-A', the optical resonator 103 has a structure in which the grating 105 and the second light-emitting body 104 are stacked. Although an edge portion of the grating 105 is exposed in the structure illustrated in FIG. 1B, the edge portion of the grating 105 may be covered with the second light-emitting body 104.

Figure 1C:
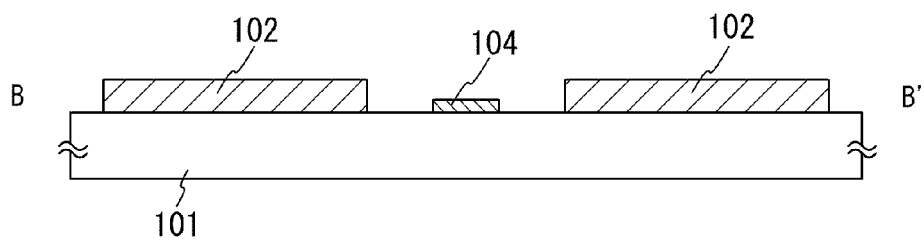

Further, the first light-emitting bodies 102 and the optical resonator 103 preferably have the same thickness. Accordingly, the thickness of the stacked film of the grating 105 and the second light-emitting body 104 is adjusted to be the same as the thickness of the first light-emitting bodies 102. Note that FIG. 1C is a cross-sectional view taken along line B-B' in FIG. 1A. Along line B-B', the grating 105 is not formed; therefore, the thickness of the second light-emitting body 104 is smaller than the thickness of the first light-emitting bodies 102 by the thickness of the grating 105.

The solid-state dye laser illustrated in this embodiment can emit a laser beam from the optical resonator 103 by irradiating the first light-emitting bodies 102 and the second light-emitting body 104 over the substrate 101 with light from a light source 106 as illustrated in FIG. 1B. Note that in the solid-state dye laser illustrated here, light from the light source 106 is first absorbed by the first light-emitting bodies 102, edge surfaces of the optical resonator 103 are irradiated with a waveguide light component of light emitted from the first light-emitting bodies 102, and then excited molecules are generated and confined in the optical resonator 103. Further, excited molecules are also generated by light that is from the light source 106 and directly absorbed by the second light-emitting body 104. Thus, excited light from the plane light source is efficiently utilized for excitation of the second light-emitting body 104 inside the optical resonator; therefore, excited molecules useful for laser emission can be increased inside the optical resonator 103, whereby the laser threshold can be further reduced.

That is, the solid-state dye laser described in this embodiment has a structure that enables light from the light source to be gathered efficiently. Therefore, an incoherent light source with low output can also be used without limitation to a coherent light source with high output, and the light source can be selected from a variety of light sources. Accordingly, a plane light source such as a light-emitting element (e.g., a light-emitting diode array, an organic EL element), a cold cathode tube, or a plane fluorescent lamp can be used as the light source 106.

The first light-emitting bodies 102 of this embodiment each include a substance that absorbs light emitted from the light source 106, and the second light-emitting body 104 included in the optical resonator 103 includes a substance that absorbs light emitted from the first light-emitting bodies 102 and further absorbs light emitted from the light source 106. Thus, light which is from the light source 106 and absorbed by the first light-emitting bodies 102 can be absorbed by the second light-emitting body 104 in the above-described manner.

A substance having a high emission quantum efficiency can be used as the substrate for the first light-emitting bodies 102, and a substance having not only a high emission quantum efficiency but also a laser active property (a so-called laser dye) can be used as the substance for the second light-emitting body 104. Note that as the substances that can be used for the first light-emitting bodies 102 and the second light-emitting body 104, there are light-emitting organic and inorganic materials, which are largely classified into (1) organic low-molecular weight fluorescent dyes including a laser dye, (2) organic EL light-emitting materials, (3) π-conjugated polymers, and (4) compound semiconductor quantum-dot fine-particle materials; however, the substances are not limited thereto.

In the category of (1), there are oxazole, oxadiazole, DCM1 (4-(dicyanomethylene)-2-methyl-6-(p-dimethylaminostyryl)-4H-pyran), pyridine, pyrromethene, fluorescein, kiton red, oligothiophene, pyridine2, and the like, and derivatives thereof.

In the category of (2), there are N,N'-bis[4-(9H-carbazol-9-yl)phenyl]-N,N'-diphenylstilbene-4,4'-diamine (abbreviation: YGA2S), 4-(9H-carbazol-9-yl)-4'-(10-phenyl-9-anthryl)triphenylamine, N-(9,10-diphenyl-2-anthryl)-N,9-diphenyl-9H-carbazol-3-amine (abbreviation: 2PCAPA), N-[9,10-bis(1,1'-biphenyl-2-yl)-2-anthryl]-N,9-diphenyl-9H-carbazol-3-amine (abbreviation: 2PCABPhA), N-(9,10-diphenyl-2-anthryl)-N,N',N'-triphenyl-1,4-phenylenediamine (abbreviation: 2DPAPA), N-[9,10-bis(1,1'-biphenyl-2-yl)-2-anthryl]-N,N',N'-triphenyl-1,4-phenylenediamine (abbreviation: 2DPABPhA), 9,10-bis(1,1'-biphenyl-2-yl)-N-[4-(9H-carbazol-9-yl)phenyl]-N-phenylanthracen-2-amine (abbreviation: 2YGABPhA), N,N,9-triphenylanthracen-9-amine (abbreviation: DPhAPhA), rubrene, 5,12-bis(1,1'-biphenyl-4-yl)-6,11-diphenyltetracene (abbreviation: BPT), N,N,N',N'-tetrakis(4-methylphenyl)tetracene-5,11-diamine (abbreviation: p-mPhTD), 7,13-diphenyl-N,N,N',N'-tetrakis(4-methylphenyl)acenaphtho[1,2-a]fluoranthene-3,10-diamine (abbreviation: p-mPhAFD), and the like.

In the category of (3), there are poly(9,9-dioctylfluorene-2,7-diyl) (abbreviation: POF), poly[(9,9-dioctylfluorene-2,7-diyl)-co-(2,5-dimethoxybenzene-1,4-diyl)] (abbreviation: PF-DMOP), poly{(9,9-dioctylfluorene-2,7-diyl)-co-[N,N'-di-(p-butylphenyl)-1,4-diaminobenzene]} (abbreviation: TAB-PFH), poly(p-phenylenevinylene) (abbreviation: PPV), poly[(9,9-dihexylfluorene-2,7-diyl)-alt-co-(benzo[2,1,3]thiadiazole-4,7-diyl)] (abbreviation: PFBT), poly[(9,9-dioctyl-2,7-divinylenefluorenylene)-alt-co-(2-methoxy-5-(2-ethylhexyloxy)-1,4-phenylene)], poly[2-methoxy-5-(2'-ethylhexoxy)-1,4-phenylenevinylene] (abbreviation: MEH-PPV), poly(3-butylthiophene-2,5-diyl) (abbreviation: R4-PAT), poly{[9,9-dihexyl-2,7-bis(1-cyanovinylene)fluorenylene]-alt-co-[2,5-bis(N,N'-diphenylamino)-1,4-phenylene]}, poly{[2-methoxy-5-(2-ethylhexyloxy)-1,4-bis(1-cyanovinylenephenylene)]-alt-co-[2,5-bis( N,N'-diphenylamino)-1,4-phenylene]} (abbreviation: CN-PPV-DPD), and the like.

In the category of (4), there are CdSe nanoparticles, CdS nanoparticles, ZnO nanoparticles, and the like.

Further, in the first light-emitting bodies 102 and the second light-emitting body 104, another substance may be used as a host substance in combination with any of the above-described substances as a guest substance in order to form a host-guest relationship. Note that as the host substance, a substance which absorbs excitation light to make a guest molecule emit light, such as polyvinylcarbazole, 4,4'-bis[N-(1-naphthyl)-N-phenylamino]biphenyl (abbreviation: NPB), 4,4'-di(N-carbazolyl)biphenyl (abbreviation: CBP), and the like, can be given. Alternatively, a transparent resin such as polymethylmethacrylate (abbreviation: PMMA), polycarbonate, or polystyrene can be used.

The first light-emitting bodies 102 and the second light-emitting body 104 can be formed by an evaporation method (a vacuum evaporation method), a transfer method, a spin coating method, an ink-jet method, a sol-gel method, or the like.

The optical resonator 103 illustrated in FIGS. 1A to 1C is a distributed feedback (DFB) resonator having a stacked structure of the grating 105 and the second light-emitting body 104; however, the optical resonator 103 is not limited to this in the present invention and may be a distributed Bragg reflector (DBR) resonator, a ring resonator, a microspherical resonator, a whispering-gallery mode microdisk, or photonic crystals.

Further, the shapes of and positional correlation between the first light-emitting bodies 102, and the second light-emitting body 104 and the optical resonator 103 may be set as appropriate without being limited to those illustrated in FIGS. 1A to 1C. For example, the first light-emitting body 102 may be toroidal and the second light-emitting body 104 and the optical resonator 103 which form a circular shape may be arranged in the toroid's hole, so that the light-gathering rate can be further increased.

Figure 2A:
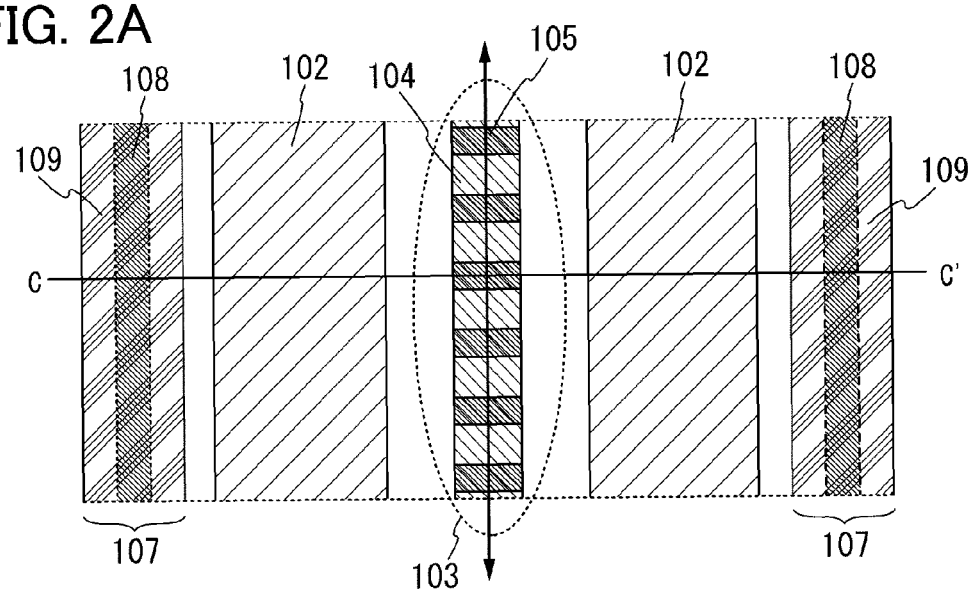
FIGS. 2A to 2C illustrate solid-state dye lasers according to an embodiment of the present invention.
Figure 2B:
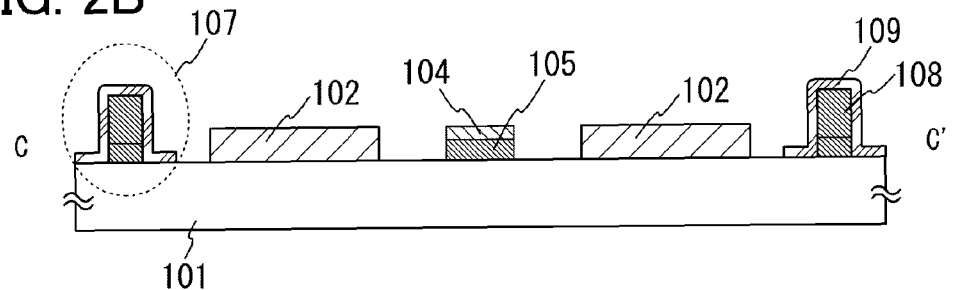
Figure 2C:
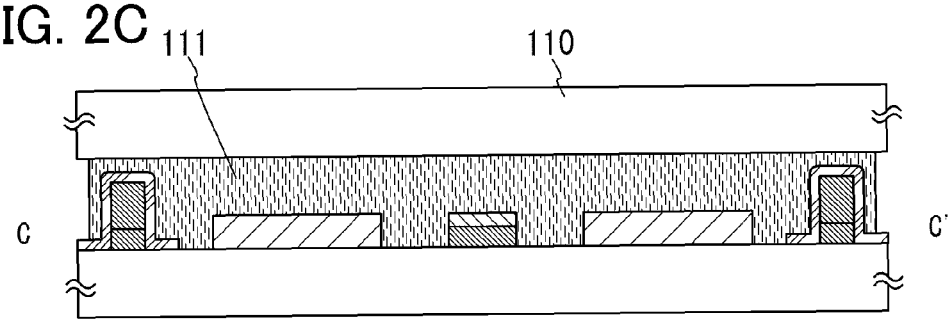

Alternatively, as illustrated in FIGS. 2A to 2C, a reflector 107 may be provided over an edge portion of the substrate 101 which is not located in the laser emission direction (not in directions indicated by arrows in FIG. 2A). Note that the first light-emitting bodies 102 and the optical resonator 103 are formed over the substrate 101. FIG. 2B is a cross-sectional view taken along line C-C' in FIG. 2A. The reflector 107 illustrated here has a structure in which a reflective film 109 (silver, aluminum, or the like) which is a highly-reflective metal film is stacked over a projection 108 which is formed using an insulating material (silicon oxide, silicon nitride, or the like). The shapes of the projection 108 and the reflective film 109 may be formed by a known patterning technique. In the case of FIGS. 2B and 2C, the projection 108 is formed by a stack of an insulating film formed at the same time as the formation of the grating 105 and an insulating film formed in a later step.

By providing the reflector 107 for the solid-state dye laser in this manner, light that is not absorbed by the first light-emitting bodies 102 and the second light-emitting body 104 can be prevented from leaking to the outside, whereby excited molecules used for laser emission can be increased in the optical resonator 103; thus, the laser threshold can be further reduced.

In the solid-state dye laser of an embodiment according to the present invention, the substrate 101 on which the first light-emitting bodies 102, the optical resonator 103, and the like are formed may be sealed with another substrate 110 as illustrated in FIG. 2C. In this case, a sealant may be provided in the periphery of the substrate 101 and the substrate 110 may be attached so that a space between the substrates may be left, or the space between the substrate 101 and the substrate 110 may be completely filled with a sealant 111 as illustrated in FIG. 2C. Note that similarly to the substrate 101, glass, quartz, plastic, or the like can be used for the substrate 110, for example.

As the sealant 111, typically, a visible light curable resin, a UV curable resin, or a thermosetting resin can be used. For example, a bisphenol-A liquid resin, a bisphenol-A solid resin, a bromine-containing epoxy resin, a bisphenol-F resin, a bisphenol-AD resin, a phenol resin, a cresol resin, a novolac resin, a cycloaliphatic epoxy resin, an Epi-Bis epoxy resin, a glycidyl ester resin, a glycidyl amine-based resin, a heterocyclic epoxy resin, a modified epoxy resin, or the like can be used.

Embodiment 2

In Embodiment 2, a structure of a solid-state dye laser, which is an embodiment of the present invention different from that of Embodiment 1, will be described. That is, in the case where the solid-state dye laser has a sealing structure in Embodiment 1 (see FIG. 2C), a light source is not provided inside the sealing structure. In Embodiment 2, a case of providing a light source inside the sealing structure will be described.

Figure 3A:
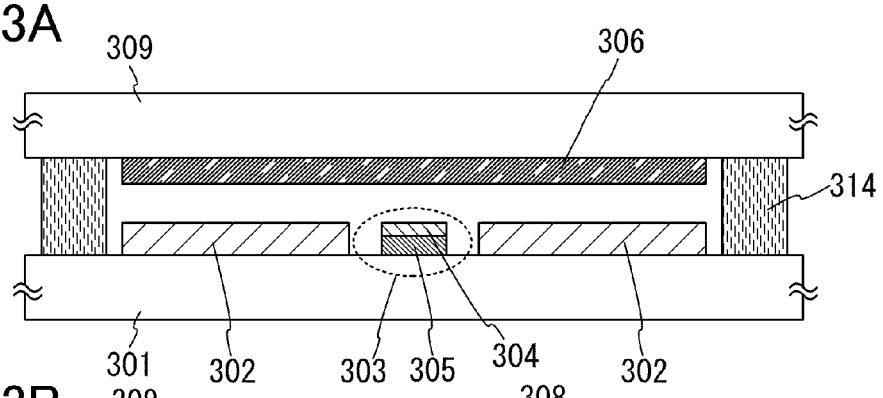
FIGS. 3A to 3D each illustrate a solid-state dye laser including an internal light source.

A solid-state dye laser in Embodiment 2 can emit a laser beam from an optical resonator 303 by irradiating first light-emitting bodies 302 and a second light-emitting body 304 with light from a light source (hereinafter referred to as an internal light source) 306 which is provided in a space surrounded by substrates 301 and 309 and a sealant 314 as illustrated in FIG. 3A. Note that in the solid-state dye laser illustrated here, light from the light source 306 is first absorbed by the first light-emitting bodies 302, edge surfaces of the optical resonator 303 are irradiated with a waveguide light component of light emitted from the first light-emitting bodies 302, and then excited molecules are generated and confined in the optical resonator 303. Further, excited molecules are also generated by light that is from the light source 306 and directly absorbed by the second light-emitting body 304. Thus, excited light from the plane light source is efficiently utilized for excitation of the second light-emitting body 304 inside the optical resonator 303; therefore, excited molecules useful for laser emission can be increased inside the optical resonator 303, whereby the laser threshold can be further reduced.

As for structures of the first light-emitting bodies 302, the optical resonator 303, and the second light-emitting body 304 and the grating 305 included in the optical resonator 303, refer to Embodiment 1 since they are similar to those of the first light-emitting bodies 102, the optical resonator 103, the second light-emitting body 104, and the grating 105 which are described in Embodiment 1, and description here is omitted.

Further, a plane light source is preferable as the light source of this embodiment, and a light-emitting element (e.g., a light-emitting diode array, an organic EL element), a cold cathode tube, or a plane fluorescent lamp can be used as the light source.

A case of using a light-emitting element as an internal light source, specifically, a case where a light-emitting element 308 utilizing organic EL is formed over the substrate 309 will be described with reference to FIG. 3B. Note that structures of the first light-emitting bodies 302 and the optical resonator 303 which are formed over the substrate 301 are similar to those of FIG. 3A.

The light-emitting element 308 has a structure in which an EL layer 313 is sandwiched between a first electrode 311 and a second electrode 312. The electrode on the substrate 309 side of the EL layer 313 is referred to as the first electrode 311. Note that one of the first electrode 311 and the second electrode 312 serves as an anode and the other serves as a cathode. When voltage is applied to the electrodes 311 and 312 so that the potential of the electrode serving as an anode is higher than that of the electrode serving as a cathode, holes and electrons are recombined in the EL layer 313 and light can be produced. In the case of this embodiment, the first light-emitting bodies 302 and the optical resonator 303 need to be irradiated with light generated from the EL layer 313 of the light-emitting element 308; therefore, at least the second electrode 312 needs to be formed to have a light-transmitting property. In addition, in order to supply light from the light-emitting element 308 without leakage to the outside, the first electrode 311 is preferably formed to have high reflectance.

As a material of the electrode serving as an anode, a metal, an alloy, an electrically conductive compound, a mixture thereof, or the like each having a high work function (specifically, a work function of higher than or equal to 4.0 eV) can be used. Specifically, indium oxide-tin oxide (ITO: Indium Tin Oxide), indium oxide-tin oxide containing silicon or silicon oxide, indium oxide-zinc oxide (IZO: Indium Zinc Oxide), indium oxide containing tungsten oxide and zinc oxide (IWZO), or the like can be used. Other than these, gold (Au), platinum (Pt), nickel (Ni), tungsten (W), chromium (Cr), molybdenum (Mo), iron (Fe), cobalt (Co), copper (Cu), palladium (Pd), titanium (Ti), nitrides of the metal materials (such as titanium nitride), and the like can be given. Note that in the case where part of the EL layer formed in contact with the electrode serving as an anode is formed using a composite material which makes it easy to inject holes regardless of the work function of the electrode material of the electrode serving as an anode, every known material can be used as long as the material can be used as an electrode material (e.g., a metal (such as aluminum or silver), an alloy, an electrically conductive compound, a mixture thereof, and an element belonging to Group 1 or Group 2 of the periodic table).

These materials are usually formed by a sputtering method. For example, indium oxide-zinc oxide (IZO) can be formed by a sputtering method using a target in which 1 wt % to 20 wt % of zinc oxide is mixed into indium oxide, or indium oxide containing tungsten oxide and zinc oxide (IWZO) can be formed by a sputtering method using a target in which 0.5 wt % to 5 wt % of tungsten oxide and 0.1 wt % to 1 wt % of zinc oxide are mixed into indium oxide. Alternatively, a vacuum evaporation method, a coating method, an ink-jet method, a spin coating method, or the like may be used.

For the EL layer 313, a known substance can be used, and any of low-molecular weight compounds and high-molecular weight compounds can be used. Note that the substance used to form the EL layer 313 may have not only a structure formed of only an organic compound but also a structure partially containing an inorganic compound.

The EL layer 313 includes at least a light-emitting layer formed of a light-emitting substance and may have a stacked structure in which other functional layers such as a hole-injecting layer including a substance with a high hole-injecting property, a hole-transporting layer including a substance with a high hole-transporting property, an electron-transporting layer including a substance with a high electron-transporting property, an electron-injecting layer including a substance with a high electron-injecting property, and the like are combined as appropriate.

Note that in the case of providing these functional layers, the hole-injecting layer, the hole-transporting layer, the electron-transporting layer, and the electron-injecting layer need to be stacked in this order from the side of the electrode serving as an anode.

As a material used for the light-emitting layer in the EL layer 313, any of the following low-molecular weight light-emitting substances can be used.

As a light-emitting substance for blue emission, there are N,N'-bis[4-(9H-carbazol-9-yl)phenyl]-N,N'-diphenylstilbene-4,4'-diamine (abbreviation: YGA2S), 4-(9H-carbazol-9-yl)-4'-(10-phenyl-9-anthryl)triphenylamine (abbreviation: YGAPA), and the like.

As a light-emitting substance for green emission, there are N-(9,10-diphenyl-2-anthryl)-N,9-diphenyl-9H-carbazol-3-amine (abbreviation: 2PCAPA), N-[9,10-bis(1,1'-biphenyl-2-yl)-2-anthryl]-N,9-diphenyl-9H-carbazol-3-amine (abbreviation: 2PCABPhA), N-(9,10-diphenyl-2-anthryl)-N,N',N'-triphenyl-1,4-phenylenediamine (abbreviation: 2DPAPA), N-[9,10-bis(1,1'-biphenyl-2-yl)-2-anthryl]-N,N',N'-triphenyl-1,4-phenylenediamine (abbreviation: 2DPABPhA), 9,10-bis(1,1'-biphenyl-2-yl)-N-[4-(9H-carbazol-9-yl)phenyl]-N-phenylanthracen-2-amine (abbreviation: 2YGABPhA), N,N,9-triphenylanthracen-9-amine (abbreviation: DPhAPhA), and the like.

As a light-emitting substance for yellow emission, there are rubrene, 5,12-bis(1,1'-biphenyl-4-yl)-6,11-diphenyltetracene (abbreviation: BPT), and the like. Furthermore, as a light-emitting substance for red emission, there are N,N,N',N'-tetrakis(4-methylphenyl)tetracene-5,11-diamine (abbreviation: p-mPhTD), 7,13-diphenyl-N,N,N',N'-tetrakis(4-methylphenyl)acenaphtho[1,2-a]fluoranthene-3,10-diamine (abbreviation: p-mPhAFD), and the like.

The light-emitting layer may have a structure in which the above-described substance having a high light-emitting property is dispersed in another substance. Note that in the case of the dispersing, the concentration of the substance to be dispersed is preferably 20% or less of the total in mass ratio. Further, as a substance in which the light-emitting substance is dispersed, a known substance can be used. It is preferable to use a substance having a lowest unoccupied molecular orbital level (LUMO level) shallower (the absolute value is smaller) than that of the light-emitting substance and a highest occupied molecular orbital level (HOMO level) deeper (the absolute value is larger) than that of the light-emitting substance.

Specifically, a metal complex such as tris(8-quinolinolato)aluminum(III) (abbreviation: Alq), tris(4-methyl-8-quinolinolato)aluminum(III) (abbreviation: Almq$_3$), bis(10-hydroxybenzo[h]quinolinato)beryllium(II) (abbreviation: BeBq$_2$), bis(2-methyl-8-quinolinolato)(4-phenylphenolato)aluminum(III) (abbreviation: BAlq), bis(8-quinolinolato)zinc(II) (abbreviation: Znq), bis[2-(2-benzoxazolyl)phenolato]zinc(II) (abbreviation: ZnPBO), or bis[2-(2-benzothiazolyl)phenolato]zinc(II) (abbreviation: ZnBTZ) can be used.

Alternatively, a heterocyclic compound such as 2-(4-biphenylyl)-5-(4-tert-butylphenyl)-1,3,4-oxadiazole (abbreviation: PBD), 1,3-bis[5-(p-tert-butylphenyl)-1,3,4-oxadiazol-2-yl]benzene (abbreviation: OXD-7), 3-(4-biphenylyl)-4-phenyl-5-(4-tert-butylphenyl)-1,2,4-triazole (abbreviation: TAZ), 2,2',2"-(1,3,5-benzenetriyl)-tris(1-phenyl-1H-benzimidazole) (abbreviation: TPBI), bathophenanthroline (abbreviation: BPhen), or bathocuproine (abbreviation: BCP) can be used.

Alternatively, the following condensed aromatic compound can also be used: 9-[4-(10-phenyl-9-anthryl)phenyl]-9H-carbazole (abbreviation: CzPA), 3,6-diphenyl-9-[4-(10-phenyl-9-anthryl)phenyl]-9H-carbazole (abbreviation: abbreviation: DPCzPA), 9,10-bis(3,5-diphenylphenyl)anthracene (abbreviation: DPPA), 9,10-di(2-naphthyl)anthracene (abbreviation: DNA), 2-tert-butyl-9,10-di(2-naphthyl)anthracene (abbreviation: t-BuDNA), 9,9'-bianthryl (abbreviation: BANT), 9,9'-(stilbene-3,3'-diyl)diphenanthrene (abbreviation: DPNS), 9,9'-(stilbene-4,4'-diyl)diphenanthrene (abbreviation: DPNS2), 3,3',3"-(benzene-1,3,5-triyl)tripyrene (abbreviation: TPB3), or the like.

As a substance in which the light-emitting substance is dispersed, plural kinds of substances can be used. For example, in order to suppress crystallization, a substance such as rubrene which suppresses crystallization, may be further added. In addition, NPB, Alq, or the like can be further added in order to efficiently transfer energy to the light-emitting substance. Thus, with a structure in which a substance having a high light-emitting property is dispersed in another substance, crystallization can be suppressed. Further, concentration quenching which results from the high concentration of the substance with a high light-emitting property can be suppressed.

Further, any of the high-molecular weight light-emitting substances described below can also be used for the light-emitting layer.

As a light-emitting substance for blue emission, there are poly(9,9-dioctylfluorene-2,7-diyl) (abbreviation: POF), poly[(9,9-dioctylfluorene-2,7-diyl-co-(2,5-dimethoxybenzene-1, 4-diyl)] (abbreviation: PF-DMOP), poly{(9,9-dioctylfluorene-2,7-diyl)-co-[N,N'-di-(p-butylphenyl)-1,4-diaminobenzene]} (abbreviation: TAB-PFH), and the like.

As a light-emitting substance for green emission, there are poly(p-phenylenevinylene) (abbreviation: PPV), poly[(9,9-dihexylfluorene-2,7-diyl)-alt-co-(benzo[2,1,3]thiadiazol-4,7-diyl)] (abbreviation: PFBT), poly[(9,9-dioctyl-2,7-divinylenefluorenylene)-alt-co-(2-methoxy-5-(2-ethylhexyloxy)-1,4-phenylene)], and the like.

As a light-emitting substance for orange to red emission, there are poly[2-methoxy-5-(2'-ethylhexoxy)-1,4-phenylenevinylene] (abbreviation: MEH-PPV), poly(3-butylthiophene-2,5-diyl) (abbreviation: R4-PAT), poly{[9,9-dihexyl-2,7-bis(1-cyanovinylene)fluorenylene]-alt-co-[2,5-bis(N,N'-diphenyl amino)-1,4-phenylene]}, poly{[2-methoxy-5-(2-ethylhexyloxy)-1,4-bis(1-cyanovinylenephenylene)]-alt-co-[2,5-bis(N,N'-diphenylamino)-1,4-phenylene]} (abbreviation: CN-PPV-DPD), and the like.

The hole-injecting layer which is one of the functional layers included in the EL layer 313 can be formed using a substance which enhances a hole-injecting property or a composite material in which an acceptor substance is mixed into a substance having a high hole-transporting property.

As the substance which enhances a hole-injecting property, metal oxides such as vanadium oxide, molybdenum oxide, ruthenium oxide, and aluminum oxide and the like can be given. Alternatively, if using an organic compound, a porphyrin-based compound is effective, and phthalocyanine (abbreviation: $H_2Pc$), copper phthalocyanine (abbreviation: CuPc), or the like can be used.

Alternatively, a high-molecular weight compound (such as oligomer, dendrimer, or polymer) can be used. For example, poly(N-vinylcarbazole) (abbreviation: PVK), poly(4-vinyl triphenylamine) (abbreviation: PVTPA), poly[N-(4-{N'-[4-(4-diphenylamino)phenyl]phenyl-N'-phenylamino}phenyl) methacrylamide] (abbreviation: PTPDMA), poly[N,N'-bis(4-butylphenyl)-N,N'-bis(phenyl)benzidine] (abbreviation: Poly-TPD), and the like can be given. In addition, high-molecular weight compounds doped with acid such as poly(3,4-ethylenedioxythiophene)/poly(styrenesufonic acid) (PEDOT/PSS) or polyanline/poly(styrenesulfonic acid) (PAni/PSS) can be used.

As the organic compound having a high hole-transporting property included in the composite material, a substance having a hole mobility of $10^{-6}$ $cm^2/Vs$ or higher is preferable.

For example, aromatic amine compounds such as 4,4',4''-tris[N-(3-methylphenyl)-N-phenylamino]triphenylamine (abbreviation: MTDATA), 4,4',4''-tris(N,N-diphenylamino) triphenylamine (abbreviation: TDATA), 4,4'-bis[N-(4-diphenylaminophenyl)-N-phenylamino]biphenyl (abbreviation: DPAB), N,N'-bis[4-[bis(3-methylphenyl)amino]phenyl]-N,N'-diphenyl-[1,1'-biphenyl]-4,4'-diamine (abbreviation: DNTPD), 1,3,5-tris[N-(4-diphenylaminophenyl)-N-phenylamino]benzene (abbreviation; DPA3B), 3-[N-(9-phenylcarbazol-3-yl)-N-phenylamino]-9-phenylcarbazole (abbreviation: PCzPCA1), 3,6-bis[N-(9-phenylcarbazol-3-yl)-N-phenylamino]-9-phenylcarbazole (abbreviation: PCzPCA2), 3-[N-(1-naphthyl)-N-(9-phenylcarbazol-3-yl)amino]-9-phenylcarbazole (abbreviation: PCzPCN1), 4,4'-bis[N-(1-naphthyl)-N-phenylamino]biphenyl (abbreviation: NPB or α-NPD), and N,N'-bis(3-methylphenyl)-N,N'-diphenyl-[1,1'-biphenyl]-4,4'-diamine (abbreviation: TPD) and carbazole derivatives such as 4,4'-di(N-carbazolyl)biphenyl (abbreviation: CBP), 1,3,5-tris[4-(N-carbazolyl)phenyl]benzene (abbreviation: TCPB), 9-[4-(N-carbazolyl)]phenyl-10-phenylanthracene (abbreviation: CzPA), and 1,4-bis[4-(N-carbazolyl)phenyl]-2,3,5,6-tetraphenylbenzene can be given.

Further, there are aromatic hydrocarbon compounds such as 2-tert-butyl-9,10-di(2-naphthyl)anthracene (abbreviation: t-BuDNA), 2-tert-butyl-9,10-di(1-naphthyl)anthracene, 9,10-bis(3,5-diphenylphenyl)anthracene (abbreviation: DPPA), 2-tert-butyl-9,10-bis(4-phenylphenyl)anthracene (abbreviation: t-BuDBA), 9,10-di(2-naphthyl)anthracene (abbreviation: DNA), 9,10-diphenylanthracene (abbreviation: DPAnth), 2-tert-butylanthracene (abbreviation: t-BuAnth), 9,10-bis(4-methyl-1-naphthyl)anthracene (abbreviation: DMNA), 9,10-bis[2-(1-naphthyl)phenyl]-2-tert-butyl-anthracene, 9,10-bis[2-(1-naphthyl)phenyl]anthracene, and 2,3,6,7-tetramethyl-9,10-di(1-naphthyl) anthracene.

Furthermore, there are 2,3,6,7-tetramethyl-9,10-di(2-naphthyl)anthracene, 9,9'-bianthryl, 10,10'-diphenyl-9,9'-bianthryl, 10,10'-bis(2-phenylphenyl)-9,9'-bianthryl, 10,10'-bis[(2,3,4,5,6-pentaphenyl)phenyl]-9,9'-bianthryl, anthracene, tetracene, rubrene, perylene, 2,5,8,11-tetra(tert-butyl)perylene, pentacene, coronene, 4,4'-bis(2,2-diphenylvinyl)biphenyl (abbreviation: DPVBi), and 9,10-bis[4-(2,2-diphenylvinyl)phenyl]anthracene (abbreviation: DPVPA).

As the acceptor substance included in the composite material, organic compounds such as 7,7,8,8-tetracyano-2,3,5,6-tetrafluoroquinodimethane (abbreviation: $F_4$-TCNQ) and chloranil, and a transition metal oxide can be given. Alternatively, oxide of metal belonging to Group 4 to Group 8 of the periodic table can be given. Specifically, vanadium oxide, niobium oxide, tantalum oxide, chromium oxide, molybdenum oxide, tungsten oxide, manganese oxide, and rhenium oxide are preferable because of a high electron accepting property. Among these, molybdenum oxide is especially preferable since it is stable in the air and its hygroscopic property is low so that it can be easily treated.

Note that the composite material may be formed using the above-described acceptor substance and a high-molecular weight compound such as poly(N-vinylcarbazole) (abbreviation: PVK), poly(4-vinyltriphenylamine) (abbreviation: PVTPA), poly[N-(4-{N'-[4-(4-diphenylamino)phenyl]phenyl-N'-phenylamino}phenyl)methacrylamide] (abbreviation: PTPDMA), or poly[N,N'-bis(4-butylphenyl)-N,N'-bis(phenyl)benzidine] (abbreviation: poly-TPD).

If a hole-injecting layer is formed using a composite material so as to be in contact with the electrode serving as an anode, the material of the electrode serving as an anode can be selected regardless of its work function. In other words, besides a material having a high work function, a material with a low work function can be used as an electrode material of the electrode serving as an anode. Such a composite material can be formed by co-depositing a substance having a high hole-transporting property and an acceptor substance.

The hole-transporting layer which is one of the functional layers included in the EL layer 313 is preferably formed using a substance having a high hole-transporting property, and for example, any of the following low-molecular weight organic compounds can be used: aromatic amine compounds such as NPB (or α-NPD), TPD, 4,4'-bis[N-(9,9'-dimethylfluoren-2-yl)-N-phenylamino]biphenyl (abbreviation: DFLDPBi), and 4,4'-bis[N-(spiro-9,9'-bifluoren-2-yl)-N-phenylamino]-1,1'-biphenyl (abbreviation: BSPB); 4,4'-di(N-carbazolyl)biphenyl (abbreviation: CBP); 2,7-di(N-carbazolyl)-spiro-9,9'-bifluorene (abbreviation: SFDCz); 4,4',4''-tris[N-(3-methylphenyl)-N-phenylamino]triphenylamine (abbreviation: m-MTDATA); N-[4-(9H-carbazol-9-yl)phenyl]-N-phenyl-spiro-9,9'-bifluoren-2-amine (abbreviation: YGASF); N,N'-bis[4-(9H-carbazol-9-yl)phenyl-N,N'-diphenylvinyl-4,4'-diamine (abbreviation: YGABP); 4-(9H-carbazol-9-yl)-2'-phenyltriphenylamine (abbreviation:

o-YGA1BP); 4-(9H-carbazol-9-yl)-3'-phenyltriphenylamine (abbreviation: m-YGA1BP); 4-(9H-carbazol-9-yl)-4'-phenyltriphenylamine (abbreviation: p-YGA1BP); 1,3,5-tri(N-carbazolyl)benzene (abbreviation: TCzB); and 4,4',4"-tris(N-carbazolyl)triphenylamine (abbreviation: TCTA). Alternatively, it is possible to use a high-molecular weight compound such as PVK, PVTPA, PTPDMA, or Poly-TPD.

Note that the above-described substances are mainly substances having a hole mobility of $10^{-6}$ cm$^2$ Vs or more. However, any known substance other than the above-described substances may be used as long as it is a substance in which the hole-transporting property is higher than the electron-transporting property.

The electron-transporting layer which is one of the functional layers included in the EL layer 313 is preferably formed using a substance having a high electron-transporting property, and for example, any of the following low-molecular weight organic compounds can be used: metal complexes such as Alq, Almq$_3$, BeBq$_2$, BAlq, Znq, ZnPBO, and ZnBTZ. Alternatively, instead of the metal complex, a heterocyclic compound such as PBD, OXD-7, TAZ, TPBI, BPhen, or BCP can be used. The substances described here are mainly substances having electron mobility of $10^{-6}$ cm$^2$/Vs or more. Note that any substance other than the above-described substances may be used for the electron-transporting layer as long as it is a substance in which the electron-transporting property is higher than the hole-transporting property. Further, the electron-transporting layer may be formed by not only a single layer but also a layered film in which two or more layers including the above-described substances are stacked.

For the electron-transporting layer, a high-molecular weight compound can also be used. For example, poly[(9,9-dihexylfluorene-2,7-diyl)-co-(pyridine-3,5-diyl)] (abbreviation: PF-Py), poly[(9,9-dioctylfluorene-2,7-diyl)-co-(2,2'-bipyridine-6,6'-diyl)] (abbreviation: PF-BPy), and the like can be used.

The electron-injecting layer which is one of the functional layers included in the EL layer 313 is preferably formed using a substance having a high electron-injecting property, and for example, an alkali metal, an alkaline-earth metal, or a compound thereof, such as lithium (Li), cesium (Cs), calcium (Ca), lithium fluoride (LiF), cesium fluoride (CsF), or calcium fluoride (CaF$_2$) can be used. Alternatively, a layer formed of a substance having an electron-transporting property which contains an alkali metal, an alkaline-earth metal, or a compound thereof, specifically, a layer formed of Alq which contains magnesium (Mg), or the like may be used.

As a material of the electrode serving as a cathode, a metal, an alloy, an electrically conductive compound, a mixture of them, or the like each having a low work function (specifically, a work function of less than or equal to 3.8 eV) can be used. As specific examples of such a cathode material, an element that belongs to Group 1 or 2 of the periodic table, that is, alkali metals such as lithium (Li) and cesium (Cs), alkaline-earth metals such as magnesium (Mg), calcium (Ca), and strontium (Sr), alloys containing these (MgAg, AlLi), rare earth metals such as europium (Eu) and ytterbium (Yb), alloys containing these, and the like can be given.

Note that in the case where the electrode serving as a cathode is formed using an alkali metal, an alkaline-earth metal, or an alloy thereof, a vacuum evaporation method or a sputtering method can be used. Alternatively, in the case of using a silver paste or the like, a coating method, an ink-jet method, or the like can be used.

In the case of providing the above-mentioned electron-injecting layer, the electrode serving as a cathode can be formed using any of various conductive materials such as Al, Ag, ITO, and indium tin oxide containing silicon or silicon oxide, regardless of its work function. These conductive materials can be deposited by a sputtering method, an ink-jet method, a spin coating method, or the like.

The light-emitting element 308 described in this embodiment may be either a passive matrix type or an active matrix type in which drive of the light-emitting element is controlled by a thin film transistor (TFT).

Figure 3B:
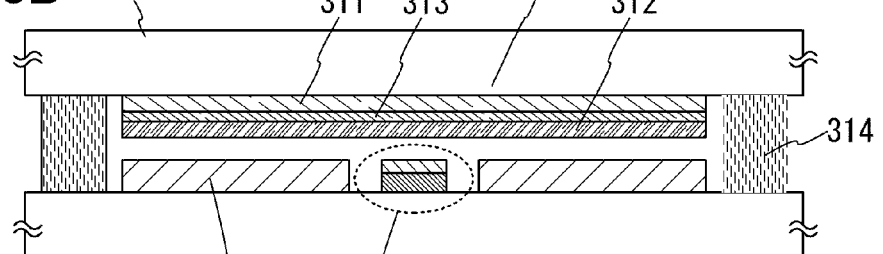

As illustrated in FIG. 3B, the substrate 301 on which the first light-emitting bodies 302 and the optical resonator 303 are formed and the substrate 309 on which the light-emitting element 308 serving as an internal light source is formed are sealed with a sealant 314; thus, a sealing structure is formed. The inside of the sealing structure is preferably filled with a nitrogen atmosphere with a small amount of oxygen or moisture in order to prevent deterioration of the light-emitting element.

Figure 3C:
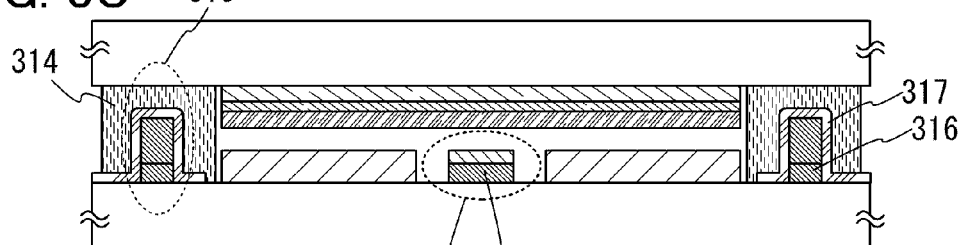

Also in the case of forming a light-emitting element as an internal light source, a reflector 315 may be provided over an edge portion of the substrate 301 which is not located in the laser emission direction (not in directions perpendicular to the paper of the drawing of FIG. 3C) (FIG. 3C). Note that the first light-emitting bodies 302 and the optical resonator 303 are formed over the substrate 301. The reflector 315 illustrated here has a structure in which a reflective film 317 (silver, aluminum, or the like) which is a highly-reflective metal film is stacked over a projection 316 which is formed using an insulating material (silicon oxide, silicon nitride, or the like). The shapes of the projection 316 and the reflective film 317 may be formed by a known patterning technique. In the case of the projection 316 illustrated in FIG. 3C, the projection 316 is formed by a stack of an insulating film formed at the same time as the formation of the grating 305, which is included in the optical resonator 303, and an insulating film formed in a subsequent step.

By provision of the reflector 315 in the solid-state dye laser in this manner, light that is not confined in the optical resonator 303 can be prevented from leaking to the outside, whereby excited molecules used for laser emission can be increased; thus, the laser threshold can be further reduced. Also in this case, the substrate 301 and the substrate 309 are attached with the sealant 314, and the inside of the sealing structure is preferably filled with a nitrogen atmosphere with a small amount of oxygen or moisture in order to prevent deterioration of the light-emitting element.

Figure 3D:
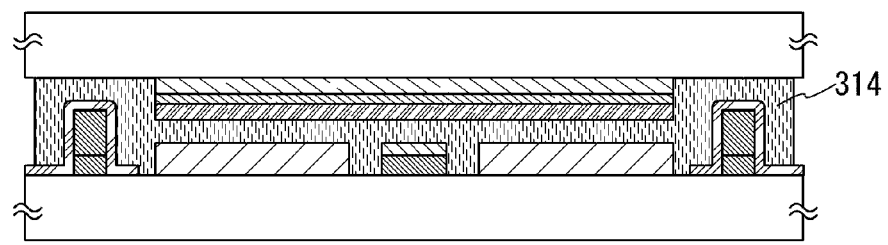

Further, the space inside the sealing structure may be completely filled with the sealant 314 as illustrated in FIG. 3D.

Embodiment 3

In Embodiment 3, a case where the areas per first light-emitting body and second light-emitting body, which are separately formed over the substrate, are small and the number of first light-emitting bodies and second light-emitting bodies, which are separately formed, is large as compared to the cases described in Embodiments 1 and 2 will be described with reference to FIGS. 4A to 4D.

Figure 4A:
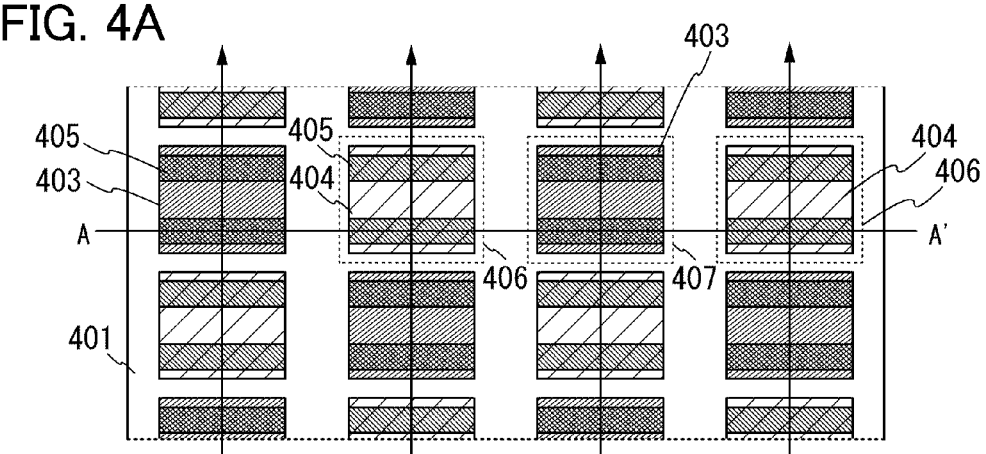
FIGS. 4A to 4D illustrate solid-state dye lasers each including a plurality of optical resonators.

FIG. 4A illustrates a case where gratings 405 are aligned in plural lines over a substrate 401 having an insulating surface. Here, the gratings 405 are aligned in four lines; however, the present invention is not limited to this and the number of lines may be changed as appropriate. Note that glass, quartz, plastic, or the like can be used for the substrate 401, for example.

The gratings 405 formed over the substrate 401 can be formed using a light-transmitting material such as silicon oxide or silicon oxynitride by a known photolithography technique or nanoimprint technique.

Further, first light-emitting bodies 403 and second light-emitting bodies 404 are separately formed over the gratings 405, and in this embodiment, portions where the second light-emitting bodies 404 are stacked over the gratings 405 are optical resonators 406. Note that in the case where the area of the first light-emitting body 403 is small enough and an optical confinement effect is weak in a portion where the first light-emitting body 403 is stacked over the grating 405 (denoted by 407 in FIG. 4A) as in this embodiment, the influence of the grating 405 can be ignored. In such a case, the grating 405 in the region where the first light-emitting body 403 is formed need not be removed and the stacked structure may be included.

Figure 4B:
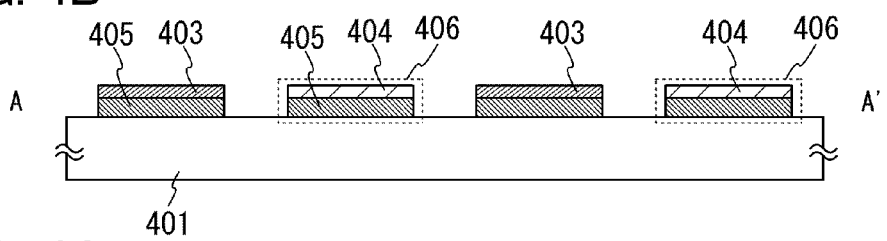

FIG. 4B is a cross-sectional view taken along line A-A' in FIG. 4A. The optical resonators 406 taken along line A-A' each have a stacked structure of the grating 405 and the second light-emitting body 404. Although an edge portion of the grating 405 is exposed in the structure illustrated in FIG. 4B, the edge portion of the grating 405 may be covered with the first light-emitting body 403 or the second light-emitting body 404.

The first light-emitting bodies 403 and the second light-emitting bodies 404, which are stacked over the gratings 405, can be formed by an evaporation method (a vacuum evaporation method), a transfer method, an ink-jet method, a sol-gel method, or the like. Since the first light-emitting bodies 403 and the second light-emitting bodies 404 are both formed over the gratings 405, the thicknesses of the first light-emitting bodies 403 and the second light-emitting bodies 404 are adjusted to have the same thickness in this embodiment.

A solid-state dye laser described in this embodiment can emit a laser beam from the optical resonators 406 by irradiating the first light-emitting bodies 403 and the second light-emitting bodies 404, which are over the substrate 401, with light from a light source (not illustrated). Note that in the solid-state dye laser illustrated here, light from the light source is first absorbed by the first light-emitting bodies 403, edge surfaces of the optical resonators 406 are irradiated with a waveguide light component of light emitted from the first light-emitting bodies 403, and then excited molecules are generated and confined in the optical resonators 406. Further, excited molecules are also generated by light that is from the light source and directly absorbed by the second light-emitting bodies 404. Thus, excited light from the plane light source is efficiently utilized for excitation of the second light-emitting bodies 404 inside the optical resonators 406; therefore, excited molecules useful for laser emission can be increased inside the optical resonators 406, whereby the laser threshold can be further reduced.

That is, the solid-state dye laser described in this embodiment has a structure that enables light from the light source to be gathered efficiently. Therefore, any of various types of light sources can be used for the solid-state dye laser of this embodiment. A plane light source such as a light-emitting element (e.g., a light-emitting diode array, an organic EL element), a cold cathode tube, or a plane fluorescent lamp can be used as the light source.

The first light-emitting bodies 403 of this embodiment include a substance that absorbs light emitted from the light source, and the second light-emitting bodies 404 included in the optical resonators 406 include a substance that absorbs light emitted from the light source and the first light-emitting bodies 403. Thus, light which is from the light source and absorbed by the first light-emitting bodies 403 can be absorbed by the second light-emitting bodies 404 in the above-described manner.

A substance having a high emission quantum efficiency can be used as the substance for the first light-emitting bodies 403, and a substance having not only a high emission quantum efficiency but also a laser active property (a so-called laser dye) can be used as the substance for the second light-emitting bodies 404. Note that as the substances that can be used for the first light-emitting bodies 403 and the second light-emitting bodies 404, there are light-emitting organic or inorganic materials, which are largely classified into (1) organic low-molecular weight fluorescent dyes including a laser dye, (2) organic EL light-emitting materials, (3) π-conjugated polymers, and (4) compound semiconductor quantum-dot fine-particle materials; however, the substances are not limited thereto.

In the category of (1), there are oxazole, oxadiazole, DCM1 (4-(dicyanomethylene)-2-methyl-6-(p-dimethylaminostyryl)-4H-pyran), pyridine, pyrromethene, fluorescein, kiton red, oligothiophene, pyridine2, and the like, and derivatives thereof.

In the category of (2), there are N,N'-bis[4-(9H-carbazol-9-yl)phenyl]-N,N'-diphenylstilbene-4,4'-diamine (abbreviation: YGA2S), 4-(9H-carbazol-9-yl)-4'-(10-phenyl-9-anthryl)triphenylamine, N-(9,10-diphenyl-2-anthryl)-N,9-diphenyl-9H-carbazol-3-amine (abbreviation: 2PCAPA), N-[9,10-bis(1,1'-biphenyl-2-yl)-2-anthryl]-N,9-diphenyl-9H-carbazol-3-amine (abbreviation: 2PCABPhA), N-(9,10-diphenyl-2-anthryl)-N,N',N'-triphenyl-1,4-phenylenediamine (abbreviation: 2DPAPA), N-[9,10-bis(1,1'-biphenyl-2-yl)-2-anthryl]-N,N',N'-triphenyl-1,4-phenylenediamine (abbreviation: 2DPABPhA), 9,10-bis(1,1'-biphenyl-2-yl)-N-[4-(9H-carbazol-9-yl)phenyl]-N-phenylanthracen-2-amine (abbreviation: 2YGABPhA), N,N,9-triphenylanthracen-9-amine (abbreviation: DPhAPhA), rubrene, 5,12-bis(1,1'-biphenyl-4-yl)-6,11-diphenyltetracene (abbreviation: BPT), N,N,N',N'-tetrakis(4-methylphenyl)tetracene-5,11-diamine (abbreviation: p-mPhTD), 7,13-diphenyl-N,N,N',N'-tetrakis(4-methylphenyl)acenaphtho[1,2-a]fluoranthene-3,10-diamine (abbreviation: p-mPhAFD), and the like.

In the category of (3), there are poly(9,9-dioctylfluorene-2,7-diyl) (abbreviation: POF), poly[(9,9-dioctylfluorene-2,7-diyl-co-(2,5-dimethoxybenzene-1,4-diyl)] (abbreviation: PF-DMOP), poly{(9,9-dioctylfluorene-2,7-diyl)-co-[N,N'-di-(p-butylphenyl)-1,4-diaminobenzene]} (abbreviation: TAB-PFH), poly(p-phenylenevinylene) (abbreviation: PPV), poly[(9,9-dihexylfluorene-2,7-diyl)-alt-co-(benzo[2,1,3]thiadiazole-4,7-diyl)] (abbreviation: PFBT), poly[(9,9-dioctyl-2,7-divinylenefluorenylene)-alt-co-(2-methoxy-5-(2-ethylhexyloxy)-1,4-phenylene)], poly[2-methoxy-5-(2'-ethylhexoxy)-1,4-phenylenevinylene] (abbreviation: MEH-PPV), poly(3-butylthiophene-2,5-diyl) (abbreviation: R4-PAT), poly{[9,9-dihexyl-2,7-bis(1-cyanovinylene)fluorenylene]-alt-co-[2,5-bis(N,N'-diphenylamino)-1,4-phenylene]}, poly{[2-methoxy-5-(2-ethylhexyloxy)-1,4-bis(1-cyanovinylenephenylene)]-alt-co-[2,5-bis( N,N'-diphenylamino)-1,4-phenylene]} (abbreviation: CN-PPV-DPD), and the like.

In the category of (4), there are CdSe nanoparticles, CdS nanoparticles, ZnO nanoparticles, and the like.

Further, in the first light-emitting bodies 403 and the second light-emitting bodies 404, another substance may be used as a host substance in combination with any of the above-described substances as a guest substance in order to form a host-guest relationship. Note that as the host substance, a substance which absorbs excitation light to make a guest molecule emit light, such as polyvinylcarbazole, 4,4'-bis[N-(1-naphthyl)-N-phenylamino]biphenyl (abbreviation: NPB), 4,4'-di(N-carbazolyl)biphenyl (abbreviation: CBP), and the like, can be given. Alternatively, a transparent resin such as polymethylmethacrylate (abbreviation: PMMA), polycarbonate, or polystyrene can be used.

The first light-emitting bodies 403 and the second light-emitting bodies 404 can be formed by an evaporation method (a vacuum evaporation method), a transfer method, a spin coating method, an ink-jet method, a sol-gel method, or the like.

The optical resonators 406 illustrated in FIGS. 4A to 4D are distributed feedback (DFB) resonators each having a stacked structure of the grating 405 and the second light-emitting body 404; however, the optical resonators 406 are not limited to this in the present invention and may be distributed Bragg reflector (DBR) resonators, ring resonators, microspherical resonators, whispering-gallery mode microdisks, or photonic crystals.

Figure 4C:
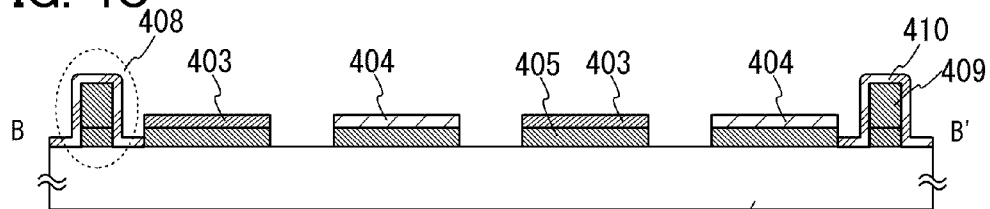
Figure 4D:
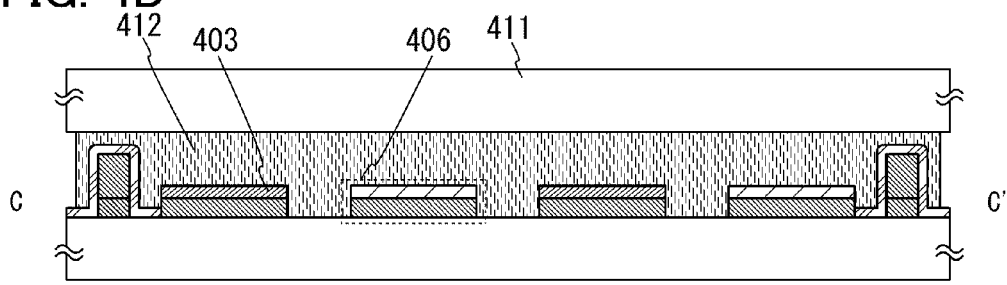

Further, as illustrated in FIG. 4C, a reflector 408 may be provided over an edge portion of the substrate 401 which is not located in the laser emission direction (not in directions indicated by arrows in FIG. 4A). Note that the first light-emitting bodies 403 and the optical resonators 406 are formed over the substrate 401. The reflector 408 illustrated here has a structure in which a reflective film 410 (silver, aluminum, or the like) which is a highly-reflective metal film is stacked over a projection 409 which is formed using an insulating material (silicon oxide, silicon nitride, or the like). The shapes of the projection 409 and the reflective film 410 may be formed by a known patterning technique. In the case of FIGS. 4C and 4D, the projection 409 is formed by a stack of an insulating film formed at the same time as the formation of the gratings 405 and an insulating film formed in a subsequent step.

By providing the reflector 408 for the solid-state dye laser in this manner, light that is not absorbed by the first light-emitting bodies 403 and the second light-emitting bodies 404 can be prevented from leaking to the outside, whereby excited molecules used for laser emission can be increased in the optical resonators 406; thus, the laser threshold can be further reduced.

In the solid-state dye laser of an embodiment according to the present invention, the substrate 401 on which the first light-emitting bodies 403, the optical resonators 406, and the like are formed may be sealed with another substrate 411 as illustrated in FIG. 4D. In this case, a sealant may be provided in the periphery of the substrate 401 and the substrate 411 may be attached so that a space between the substrates may be left, or the space between the substrate 401 and the substrate 411 may be completely filled with a sealant 412 as illustrated in FIG. 4D. Note that similarly to the substrate 401, glass, quartz, plastic, or the like can be used for the substrate 411, for example.

As the sealant 412, typically, a visible light curable resin, a UV curable resin, or a thermosetting resin can be used. For example, a bisphenol-A liquid resin, a bisphenol-A solid resin, a bromine-containing epoxy resin, a bisphenol-F resin, a bisphenol-AD resin, a phenol resin, a cresol resin, a novolac resin, a cycloaliphatic epoxy resin, an Epi-Bis epoxy resin, a glycidyl ester resin, a glycidyl amine-based resin, a heterocyclic epoxy resin, a modified epoxy resin, or the like can be used.

The solid-state dye laser described in this embodiment includes a plurality of first light-emitting bodies 403 over one substrate; therefore, efficiency of confining excited molecules in the optical resonators can be further improved and the laser threshold can be further reduced.

Embodiment 4

In Embodiment 4, a case where the area per second light-emitting body, which is separately formed over a substrate 501, is small and the number of second light-emitting bodies 504, which are separately formed, is large as compared to the cases described in Embodiments 1 and 2 and where one film of first light-emitting body 503 is formed over the substrate 501 regardless of the existence of the gratings 502, which is different from the structure of Embodiment 3 in which a plurality of first light-emitting bodies 503 are separately formed, will be described with reference to FIGS. 5A to 5D.

Figure 5A:
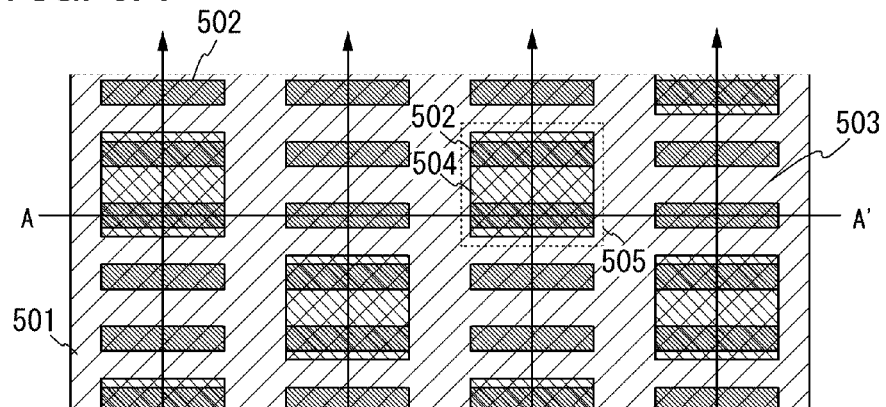
FIGS. 5A to 5D illustrate solid-state dye lasers each including an optical resonator in which light-emitting bodies are stacked.
Figure 5B:
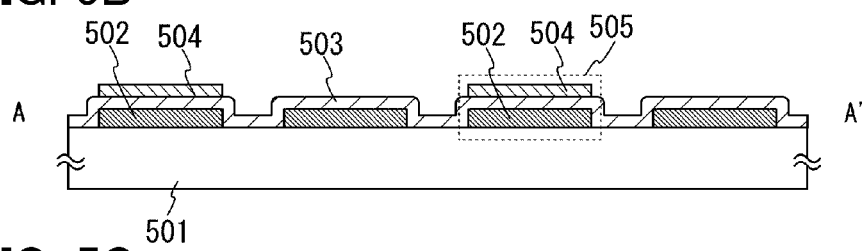

FIG. 5A illustrates a case where gratings 502 are aligned in plural lines over a substrate 501 having an insulating surface. Here, the gratings 502 are aligned in four lines; however, the present invention is not limited to this and the number of lines may be changed as appropriate. Note that glass, quartz, plastic, or the like can be used for the substrate 501, for example.

The gratings 502 formed over the substrate can be formed using a light-transmitting material such as silicon oxide or silicon oxynitride by a known photolithography technique or nanoimprint technique.

The first light-emitting body 503 is formed over the gratings 502. The first light-emitting body 503 is formed as one film to cover the gratings 502 over the substrate 501. The second light-emitting bodies 504 are separately formed over the gratings 502 and the first light-emitting body 503 and in regions where optical resonators are formed. Accordingly, in this embodiment, portions where the first light-emitting body 503 and the second light-emitting bodies 504 are stacked over the gratings 502 are optical resonators 505. Note that even in the case where the first light-emitting body is included in part of the optical resonators 505 as in this embodiment, light absorbed by the first light-emitting body 503 is further absorbed by the second light-emitting bodies 504; therefore, the existence of the first light-emitting body 503 in the optical resonators 505 is not a problem.

The first light-emitting body 503 and the second light-emitting bodies 504, which are stacked over the gratings 502, can be formed by an evaporation method (a vacuum evaporation method), a transfer method, an ink-jet method, a sol-gel method, or the like. In the case of this embodiment, since patterning of the first light-emitting body 503 is not necessary, the process can be simplified as compared to the process in Embodiment 3 in which patterning of the first light-emitting bodies is necessary.

A solid-state dye laser described in this embodiment can emit laser beams from the optical resonators 505 by irradiating the first light-emitting body 503 and the second light-emitting bodies 504, which are over the substrate 501, with light from a light source (not illustrated). Note that in the solid-state dye laser illustrated here, light from the light source is first absorbed by the first light-emitting body 503, the optical resonators 505 are irradiated with light emitted from the first light-emitting body 503 using a waveguide light and so on, and then excited molecules are generated and confined in the optical resonators 505. Further, excited molecules are also generated by light that is from the light source and directly absorbed by the second light-emitting bodies 504. Thus, excited light from the plane light source is efficiently utilized for excitation of the second light-emitting bodies 504 inside the optical resonators; therefore, excited molecules useful for laser emission can be increased inside the optical resonators 505, whereby the laser threshold can be further reduced.

That is, the solid-state dye laser described in this embodiment has a structure that enables light from the light source to be gathered efficiently. Therefore, any of various types of light sources can be used for the solid-state dye laser of this embodiment. A plane light source such as a light-emitting element (e.g., a light-emitting diode array, an organic EL element), a cold cathode tube, or a plane fluorescent lamp can be used as the light source.

The first light-emitting body 503 of this embodiment includes a substance that absorbs light emitted from the light source, and the second light-emitting bodies 504 included in the optical resonators 505 include a substance that absorbs light emitted from the light source and the first light-emitting body 503. Thus, light which is from the light source and absorbed by the first light-emitting body 503 can be absorbed by the second light-emitting bodies 504 in the above-described manner.

As materials of the first light-emitting body 503 and the second light-emitting bodies 504, there are oxazole, oxadiazole, DCM1 (4-(dicyanomethylene)-2-methyl-6-(p-dimethylaminostyryl)-4H-pyran), pyridine, pyrromethene, fluorescein, kiton red, poly(p-phenylenevinylene), oligothiophene, pyridine2, and the like, and derivatives thereof. However, as described above, a substance that can absorb light emitted from the substance used for the first light-emitting body 503 needs to be selected as appropriate, as the substance used for the second light-emitting bodies 504.

Further, in the second light-emitting bodies 504, another substance may be used as a host substance in combination with any of the above-described substances as a guest substance in order to form a host-guest relationship. Note that as the host substance, polyvinylcarbazole, 4,4'-bis[N-(1-naphthyl)-N-phenylamino]biphenyl (abbreviation: NPB), 4,4'-di(N-carbazolyl)biphenyl (abbreviation: CBP), polymethylmethacrylate, and the like, can be given.

The first light-emitting body 503 and the second light-emitting bodies 504 can be formed by an evaporation method (a vacuum evaporation method), a transfer method, an ink-jet method, a sol-gel method, or the like.

The optical resonators 505 illustrated in FIGS. 5A to 5D are distributed feedback (DFB) resonators each having a stacked structure of the grating 502, the first light-emitting body 503 and the second light-emitting body 504; however, the optical resonators 505 are not limited to this in the present invention and may be distributed Bragg reflector (DBR) resonators, ring resonators, microspherical resonators, whispering-gallery mode microdisks, or photonic crystals.

Figure 5C:
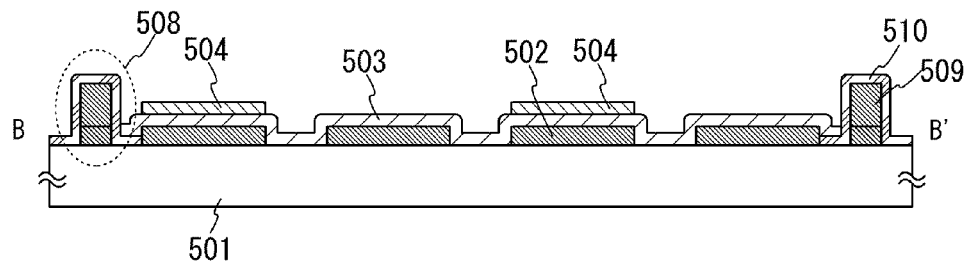
Figure 5D:
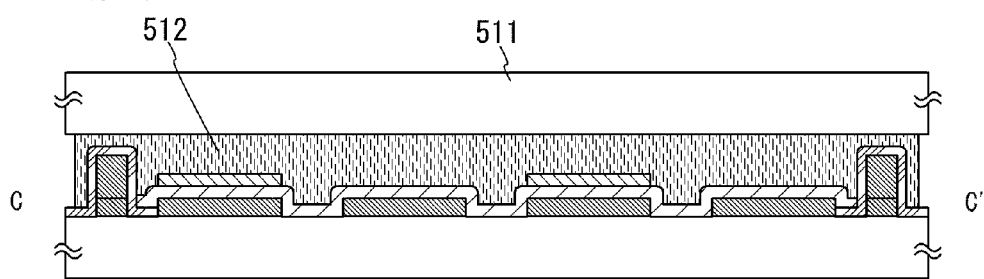

Further, as illustrated in FIG. 5C, a reflector 508 may be provided over an edge portion of the substrate 501 which is not located in the laser emission direction (not in directions indicated by arrows in FIG. 5A). Note that the first light-emitting body 503 and the optical resonators 505 are formed over the substrate 501. The reflector 508 illustrated here has a structure in which a reflective film 510 (silver, aluminum, or the like) which is a highly-reflective metal film is stacked over a projection 509 which is formed using an insulating material (silicon oxide, silicon nitride, or the like). The shapes of the projection 509 and the reflective film 510 may be formed by a known patterning technique. In the case of FIGS. 5C and 5D, the projection 509 is formed by a stack of an insulating film formed at the same time as the formation of the gratings 502 and an insulating film formed in a subsequent step.

By providing the reflector 508 for the solid-state dye laser in this manner, light that is not absorbed by the first light-emitting body 503 and the second light-emitting bodies 504 can be prevented from leaking to the outside, whereby excited molecules used for laser emission can be increased; thus, the laser threshold can be further reduced.

In the solid-state dye laser of an embodiment according to the present invention, the substrate 501 on which the first light-emitting body 503, the optical resonators 505, and the like are formed may be sealed with another substrate 511 as illustrated in FIG. 5D. In this case, a sealant may be provided in the periphery of the substrate 501 and the substrate 511 may be attached so that a space between the substrates may be left, or the space between the substrate 501 and the substrate 511 may be completely filled with a sealant 512 as illustrated in FIG. 5D. Note that similarly to the substrate 501, glass, quartz, plastic, or the like can be used for the substrate 511, for example.

As the sealant 512, typically, a visible light curable resin, a UV curable resin, or a thermosetting resin can be used. For example, a bisphenol-A liquid resin, a bisphenol-A solid resin, a bromine-containing epoxy resin, a bisphenol-F resin, a bisphenol-AD resin, a phenol resin, a cresol resin, a novolac resin, a cycloaliphatic epoxy resin, an Epi-Bis epoxy resin, a glycidyl ester resin, a glycidyl amine-based resin, a heterocyclic epoxy resin, a modified epoxy resin, or the like can be used.

In the case of the solid-state dye laser described in this embodiment, since patterning of the first light-emitting body 503 is not necessary, the process can be simplified as compared to the process in Embodiment 3 in which patterning of the first light-emitting bodies is necessary.

This application is based on Japanese Patent Application serial No. 2008-221457 filed with Japan Patent Office on Aug. 29, 2008, the entire contents of which are hereby incorporated by reference.

What is claimed is:

1. A solid-state dye laser comprising:
   a first light-emitting body over a substrate; and
   an optical resonator including a diffraction grating and a second light-emitting body overlapping the diffraction grating over the substrate,
   wherein the first light-emitting body includes a substance that absorbs light emitted from a light source, and
   wherein the second light-emitting body includes a substance that absorbs light emitted from the light source and the first light-emitting body.

2. The solid-state dye laser according to claim 1, wherein the light source is any one of an organic EL element, a light-emitting diode, a cold cathode tube, and a plane fluorescent lamp.

3. The solid-state dye laser according to claim 1, wherein the first light-emitting body includes a substance with an emission quantum efficiency of 50% or higher.

4. The solid-state dye laser according to claim 1, wherein the second light-emitting body includes at least one material having an emission quantum efficiency of 50% or higher and a laser active property, the material being selected from the group consisting of a stilbene-based material, a coumarin-based material, a xanthene-based material, a cyanine-based material, an oxazine-based material, a rhodamine-based material, and a styryl-based substance material.

5. The solid-state dye laser according to claim 1, wherein a reflector is formed over an edge portion of the substrate which is not located in a direction in which a beam is emitted by the optical resonator from the solid-state dye laser.

6. A solid-state dye laser comprising:
   a light source adjacent to a first substrate; and
   a first light-emitting body and an optical resonator including a diffraction grating and a second light-emitting body overlapping the diffraction grating in contact with a second substrate,
   wherein the first substrate and the second substrate are disposed so that the light source, the first light-emitting body and the optical resonator are disposed between the first substrate and the second substrate, wherein the first light-emitting body includes a substance that absorbs light emitted from the light source, and wherein the second light-emitting body includes a substance that absorbs light emitted from the light source and the first light-emitting body.

7. The solid-state dye laser according to claim 6, wherein the light source is any one of an organic EL element, a light-emitting diode, a cold cathode tube, and a plane fluorescent lamp.

8. The solid-state dye laser according to claim 6, wherein the first light-emitting body includes a substance with an emission quantum efficiency of 50% or higher.

9. The solid-state dye laser according to claim 6, wherein the second light-emitting body includes at least one material having an emission quantum efficiency of 50% or higher and a laser active property, the material being selected from the group consisting of a stilbene-based material, a coumarin-based material, a xanthene-based material, a cyanine-based material, an oxazine-based material, a rhodamine-based material, and a styryl-based substance material.

10. The solid-state dye laser according to claim 6, wherein a reflector is formed over an edge portion of the second substrate which is not located in a direction in which a beam is emitted by the optical resonator from the solid-state dye laser.

11. A solid-state dye laser comprising:
a light-emitting element adjacent to a first substrate; and
a first light-emitting body and an optical resonator including a diffraction grating and a second light-emitting body overlapping the diffraction grating in contact with a second substrate, wherein the first substrate and the second substrate are disposed so that a light source, the first light-emitting body and the optical resonator are disposed between the first substrate and the second substrate, wherein the first light-emitting body includes a substance that absorbs light emitted from the light-emitting element, and wherein the second light-emitting body includes a substance that absorbs light emitted from the light-emitting element and the first light-emitting body.

12. The solid-state dye laser according to claim 11, wherein the first light-emitting body includes a substance with an emission quantum efficiency of 50% or higher.

13. The solid-state dye laser according to claim 11, wherein the second light-emitting body includes at least one material having an emission quantum efficiency of 50% or higher and a laser active property, the material being selected from the group consisting of a stilbene-based material, a coumarin-based material, a xanthene-based material, a cyanine-based material, an oxazine-based material, a rhodamine-based material, and a styryl-based substance material.

14. The solid-state dye laser according to claim 11, wherein a reflector is formed over an edge portion of the second substrate which is not located in a direction in which a beam is emitted by the optical resonator from the solid-state dye laser.

* * * * *